United States Patent
Matthews

(10) Patent No.: US 10,892,999 B1
(45) Date of Patent: Jan. 12, 2021

(54) DETECTION OF HARDWARE ASSISTANCE FOR AN OVERLAY NETWORK

(71) Applicant: Amazon Technologies, Inc., Seattle, WA (US)

(72) Inventor: Nicholas Channing Matthews, Atlanta, GA (US)

(73) Assignee: Amazon Technologies, Inc., Seattle, WA (US)

(*) Notice: Subject to any disclaimer, the term of this patent is extended or adjusted under 35 U.S.C. 154(b) by 146 days.

(21) Appl. No.: 15/801,169

(22) Filed: Nov. 1, 2017

(51) Int. Cl.
*G06F 13/00* (2006.01)
*H04L 12/911* (2013.01)
*H04L 12/46* (2006.01)

(52) U.S. Cl.
CPC .......... *H04L 47/82* (2013.01); *H04L 12/4641* (2013.01)

(58) Field of Classification Search
CPC ......... H04W 8/04; H04W 4/02; H04W 80/04; H04L 47/82; H04L 12/4641
USPC ................................. 709/202, 203, 224, 245
See application file for complete search history.

(56) References Cited

U.S. PATENT DOCUMENTS

| 7,751,830 | B2* | 7/2010 | Iyer | H04W 8/04 370/328 |
| 10,389,608 | B2* | 8/2019 | Searle | H04L 43/0864 |
| 2007/0291705 | A1* | 12/2007 | Iyer | H04W 8/04 370/338 |
| 2010/0067381 | A1* | 3/2010 | Hirano | H04W 8/12 370/235 |
| 2014/0280884 | A1* | 9/2014 | Searle | H04L 43/0864 709/224 |
| 2019/0372875 | A1* | 12/2019 | Searle | H04L 43/0864 |

* cited by examiner

*Primary Examiner* — Kenneth R Coulter
(74) *Attorney, Agent, or Firm* — Thorpe North & Western, LLP.

(57) ABSTRACT

Technology is described for detecting a presence of a hardware assisted overlay network. An agent running on a host in a service provider environment may receive an assistance identifier that is assigned to a gateway associated with the host in the service provider environment. The agent running on the host may determine that the host is running in a hardware assisted overlay network operating in the service provider environment using the assistance identifier of the gateway. The agent running on the host may initiate a hardware assisted function that uses hardware resources accessible to the hardware assisted overlay network.

20 Claims, 9 Drawing Sheets

---

Receiving, at an agent running on a host in a service provider environment, an assistance identifier that is assigned to a gateway associated with the host in the service provider environment — 610

Determining that the host is running in a hardware-assisted overlay network operating in the service provider environment using the assistance identifier of the gateway — 620

Initiating, at the agent, a hardware-assisted function that uses hardware resources accessible to the hardware-assisted overlay network — 630

US 10,892,999 B1

DETECTION OF HARDWARE ASSISTANCE FOR AN OVERLAY NETWORK

BACKGROUND

Many companies and organizations operate computer networks that interconnect numerous computing systems to support their operations. The computer networks may include computing systems in private local networks or in multiple distinct geographical locations connected via private networks or shared networks (e.g., the internet). For example, data centers housing significant numbers of networked computing systems may be created, such as private data centers that are operated by a single organization, as well as public data centers that are operated by business entities.

Virtualization networking technologies and other computing networks may use an overlay network to enable computing systems to communicate in more flexible ways. An overlay network is a virtual network that is built on top of an existing networking hardware infrastructure, or underlay network (e.g., Ethernet switches or routers). Nodes in an overlay network may be connected by virtual or logical links, which may correspond to a path through physical links in the underlay network. An overlay network may utilize software virtualization to create additional layers of network abstraction, which may be run on top of the underlay network, thereby providing services and security benefits with an increased degree of decoupling from the underlay network. In one example, an overlay network may be formed by creating a virtual connection between multiple endpoints (e.g., actual physical locations, such as a network port, or logical locations designated by a software address in a networking cloud), and the overlay network may be built using software over the existing networking hardware infrastructure.

Furthermore, overlay networks used in combination with virtualization technologies may assist with providing virtualized resources, virtualized services, or computing instances that reside on physical computing systems. While the availability of virtualization technologies has provided certain benefits, various problems still exist, including problems related to effectively providing access to the resources of the physical computing systems while a virtualization layer is being used.

DETAILED DESCRIPTION

Figure 1A:
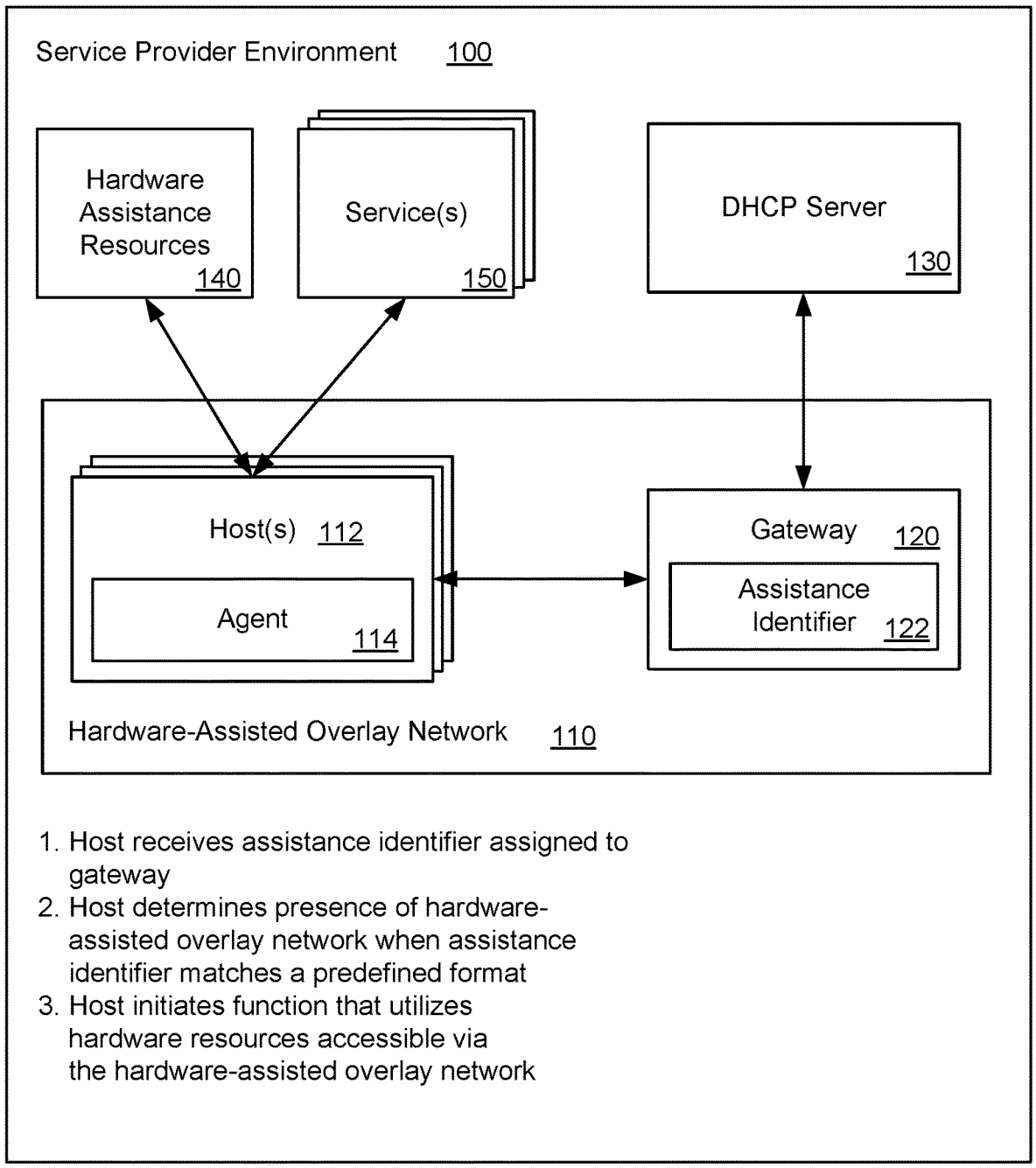
FIG. 1A illustrates a system and related operations for detecting hardware assistance for an overlay network according to an example of the present technology.

Technologies are described for detecting hardware assistance for an overlay network in a service provider environment. For example, an agent on a host may detect that the host is included in a hardware assisted overlay network. After detecting the presence of the hardware assistance for the overlay network, the host may utilize hardware resources that are accessible to the hardware assisted overlay network to perform hardware assisted functions. In other words, hardware assisted functions performed by the host may be enhanced or assisted by the hardware resources that are accessible to the hardware assisted overlay network.

In one example, the host, such as a computing instance, may be launched in the service provider environment. The host may be launched in a virtual network that belongs to a customer, such as a virtual private cloud (VPC), in the service provider environment. The virtual network may allow the customer to connect to a private network, which may utilize appropriate security mechanisms to ensure that only an authorized customer is able to access their virtual network. Alternatively, the host may not be part of a virtual network. The host may be able to communicate with other networks and/or services in the service provider environment via a gateway. The host may be preprogrammed to use the gateway, or the gateway may be assigned to the host. In one example, the host and the gateway for the virtual network may be included in the hardware assisted overlay network, but at the time of launch, the host may not yet have detected the presence of the hardware assisted overlay network, as well as the availability of the hardware resources.

In one example, the gateway may be associated with an assistance identifier or a physical machine address, such as a media access control (MAC) address. The assistance identifier may be used to indicate whether or not there is hardware assistance available to the host. The assistance identifier for the gateway may be assigned by a dynamic host configuration protocol (DHCP) server in the service provider environment. The DHCP server may assign the assistance identifier to the gateway when the gateway starts up or is powered on in the service provider environment. The DHCP server may generate the assistance identifier for the gateway depending on whether the gateway is included in the hardware assisted overlay network. When the gateway is not included in the hardware assisted overlay network, the DHCP server may assign an assistance identifier to the gateway using existing DHCP processes. Alternatively, when the gateway is included in the hardware assisted overlay network, the DHCP server may assign an assistance identifier to the gateway that is generated or calculated using a hash function, thereby creating an assistance identifier for the gateway that adheres to a predefined format. For example, the hash function may use a combination of a virtual network identifier for the virtual network that belongs to the customer, a preshared key (PSK), a user name, a date or time, and/or a domain name to create a unique hash that adheres to the predefined format. As non-limiting examples, the hash function may be a cyclic redundancy check (CRC)

hash function that produces a 64-bit hash value or a message digest 5 (MD5) hash function that produces a 128-bit hash value. Depending on the hash function, bits may be removed so that the assistance identifier is within a certain number of bits (e.g., an initial 64 or 128 bits may be reduced down to 48 bits to correspond to a size constraint of a MAC address). The assistance identifier for the gateway may be used to determine whether the assistance identifier matches or corresponds to the predefined format. As a result, the agent on the host may determine that the host is running on a hardware assisted overlay network.

In an alternative configuration, the assistance identifier for the gateway may be assigned by the gateway. In other words, rather than the assistance identifier for the gateway being assigned by the DHCP server, the gateway may assign its own assistance identifier. The gateway may calculate the assistance identifier in a manner similar to the DHCP server. For example, the gateway may generate the assistance identifier using the hash function when the gateway is included in the hardware assisted overlay network.

In one example, the agent on the host may initiate an address resolution protocol (ARP) to access the assistance identifier for the gateway. Based on the ARP, the DHCP server may return the assistance identifier for the gateway to the agent on the host. For example, the DHCP server may be on the gateway or the DHCP server may be independent. The agent on the host may receive the assistance identifier for the gateway and then determine whether the assistance identifier matches or corresponds to the predefined format. In this example, since the host is included in the hardware assisted overlay network and therefore the DHCP server calculated the assistance identifier for the gateway using the hash function to adhere to the predefined format, the agent on the host may determine that the received assistance identifier for the gateway matches or corresponds to the predefined format. As a result, the agent on the host may determine that the host is running on a hardware assisted overlay network. In other words, the agent on the host may determine that hardware assistance is available, i.e., hardware resources are accessible to the host via the hardware assisted overlay network. Therefore, the agent on the host may determine to perform certain hardware assisted functionalities that are enhanced or assisted by the hardware resources that are accessible to the hardware assisted overlay network.

In one example, the agent may perform the detection of the hardware assisted overlay network without negatively impacting applications running on the host or the hardware assisted overlay network. For example, the host may transparently and non-intrusively detect the presence of the hardware assisted overlay network without changing a security of an application running on the host.

In past solutions, there was no ability to detect whether hardware assistance was available to an overlay network. For example, in past solutions, overlay networks were closed to the use of outside hardware resources. Alternatively, in past solutions, overlay networks were built with outside hardware resources and access to these outside hardware resources was already preconfigured to be used by the hosts running in the overlay network. Therefore, in past solutions, there was no motivation to detect whether hardware assistance was available to an overlay network.

FIG. 1A illustrates an exemplary system and related operations for detecting a presence of hardware assistance for a hardware assisted overlay network 110 in a service provider environment 100. A detection of the presence of hardware assistance for the hardware assisted overlay network 110 may be performed at a host 112. For example, the host 112 may be booted up or launched within the service provider environment 100. The host 112 may refer to a computing instance that is launched in a virtual network within the service provider environment 100. Alternatively, the host 112 may refer to a physical host or a hypervisor on a physical host that is running in the service provider environment 100. An agent 114 on the host 112 may be able to communicate with other networks and/or services 150 in the service provider environment 100 via a gateway 120. The host 112 may be preprogrammed to use the gateway 120, or the gateway 120 may be assigned to the host 112 (e.g., by a dynamic host configuration protocol (DHCP) server 130 that operates in the service provider environment 100).

In one example, the hardware assisted overlay network 110 may be built on top of an existing networking hardware infrastructure or an underlay network (e.g., underlying physical hardware, switches and routers). The hardware assisted overlay network 110 may utilize software virtualization to create additional layers of network abstraction, which may be run on top of the underlay network, thereby providing services and security benefits with an increased degree of decoupling from the underlay network.

In one example, the host 112 and the gateway 120 may be operating in the hardware assisted overlay network 110. The hardware assisted overlay network 110 may be an overlay network within the service provider environment 100 for which hardware assistance is available. For example, hardware assistance resources 140 (e.g., hardware processing and storage hardware resources) may be accessible to the host 112 that operates in the hardware assisted overlay network 110. However, when the host 112 is initially launched, the agent 114 on the host 112 may not know that the hardware assistance resources 140 are available. In other words, the agent 114 on the host 112 may not initially be aware of the presence of the hardware assisted overlay network 110, and therefore, the availability of the hardware assistance resources 140. Rather, the host 112 may be launched in the virtual network with an assumption that the virtual network is not part of the hardware assisted overlay network 110.

As described in further detail below, after the host 112 is launched, the agent 114 on the host 112 may be informed regarding the presence (or an absence) of the hardware assisted overlay network 110. More specifically, one-way information regarding the presence (or absence) of the hardware assisted overlay network 110 may be provided from the DHCP server 130 to the agent 114 on the host 112.

In one example, the hardware assistance resources 140 may be included in a physical host in the service provider environment 100 or accessed via a computing instance that runs on a physical host in the service provider environment 100. The hardware assistance resources 140 may be included in a geographically independent network that includes an overlay network and/or a physical underlay network. The geographically independent network may be within the service provider environment 100 or in another service provider environment. The hardware assistance resources 140 may include hardware processing and data storage hardware resources. More specifically, the hardware assistance resources 140 may include field-programmable gate arrays (FPGAs), programmable application-specific integrated circuits (ASICs), graphics processing units (GPUs), special-purpose or specialized hardware for certain purposes (e.g., encryption or video encoding), vector processing hardware, high performance computing hardware, optical computing hardware, etc.

In one configuration, the DHCP server 130 may assign an assistance identifier 122 to the gateway 120. The DHCP server 130 may determine the assistance identifier 122 that is assigned to the gateway 120 based on whether or not the gateway 120 is included in the hardware assisted overlay network 110. For example, when the gateway 120 is not included in the hardware assisted overlay network 110, the DHCP server 130 may assign an assistance identifier 122 to the gateway 120 using a standard process (e.g., a random assignment of the assistance identifier 122).

Alternatively, when the gateway 120 is included in the hardware assisted overlay network 110, the DHCP server 130 may assign an assistance identifier 122 to the gateway 120 that is calculated using a hash function, such that the assistance identifier 122 adheres to a predefined format. In other words, the assistance identifier 122 may be calculated using the hash function to indicate the presence of the hardware assisted overlay network 110. The hash function may use a combination of a virtual network identifier (e.g., a value for the virtual network), a preshared key (PSK), a user name and/or a domain name to create a unique hash that adheres to the predefined format. In addition, the hash function may use other strings that are relevant to the hardware assisted overlay network 110, which may be used to create the unique hash that adheres to the predefined format.

In one example, the assistance identifier 122 assigned to the gateway 120 may be a media access control (MAC) address. The MAC address may span 6 octets or 48 bits. A first 3 octets or 24 bits of the MAC address may correspond to an organizationally unique identifier (OUI), which may uniquely identify a vendor, manufacturer or other organization. A second 3 octets or 24 bits of the MAC address may be network interface controller (NIC) specific. In one example, the first 3 octets or 24 bits of the MAC address may remain intact to satisfy a convention, and the second 3 octets or 24 bits of the MAC address may be a hash of the virtual network identifier, PSK, user name, domain name, etc. In addition, depending on a type of hash function, bits may be removed from a hashed value to ensure that the MAC address assigned to the gateway 120 complies with the 48-bit size limit. For example, a cyclic redundancy check (CRC) hash function may produce a 64-bit hash value or a message digest 5 (MD5) hash function may produce a 128-bit hash value. In these cases, excess bits may be removed using an appropriate process (e.g., truncation, compression, etc.) to ensure that the MAC address assigned to the gateway 120 complies with the 48-bit size limit.

In an alternative example, the assistance identifier 122 assigned to the gateway 120 (either by the DHCP server 130 or the gateway 120) may be a static or hard coded value (i.e., a non-hashed value). For example, the assistance identifier 122 may be predefined to be a first value to indicate a presence of the hardware assisted overlay network 110, or the assistance identifier 122 may be predefined to be a second value to indicate an absence of the hardware assisted overlay network 110. However, the use of a hashed assistance identifier that is assigned to the gateway 120 may provide increased security as compared to a static assistance identifier that is assigned to the gateway 120.

In one configuration, the agent 114 on the host 112 may initiate address resolution protocol (ARP) to retrieve the assistance identifier 122 assigned to the gateway 120. Based on the ARP, the DHCP server 130 may return the assistance identifier 122 that was previously assigned by the DHCP server 130 to the gateway 120 to the agent 114 on the host 112. The agent 114 on the host 112 may receive the assistance identifier 122 from the DHCP server 130, and the agent 114 on the host 112 may determine whether the assistance identifier 122 adheres to the predefined format. For example, the agent 114 on the host 112 may determine that the assistance identifier 122 does not adhere to the predefined format, and thus, the agent 114 on the host 112 may determine an absence of the hardware assisted overlay network 110. Alternatively, the agent 114 on the host 112 may determine that the assistance identifier 122 adheres to the predefined format, and thus, the agent 114 on the host 112 may determine a presence of the hardware assisted overlay network 110. Therefore, based on the assistance identifier 122 of the gateway 120 that is returned from the DHCP server 130, the agent 114 on the host 112 may non-intrusively determine the presence or absence of the hardware assisted overlay network 110.

In one example, the agent 114 on the host 112 may determine that the presence of the hardware assisted overlay network 110 indicates an availability of the hardware assistance resources 140 in the service provider environment 100. In other words, the hardware assistance resources 140 may be accessible to the agent 114 on the host 112 via the hardware assisted overlay network 110. After determining the availability of the hardware assistance resources 140, the agent 114 on the host 112 may initiate a hardware assisted function that utilizes the hardware assistance resources 140 accessible via the hardware assisted overlay network 110. In other words, after determining the availability of the hardware assistance resources 140, the agent 114 on the host 112 may alter operations to use the enhanced or assisted capabilities of the hardware assisted overlay network 110.

In one example, the agent 114 on the host 112 may initiate a hardware-accelerated function that is enabled by the hardware assistance resources 140 accessible via the hardware assisted overlay network 110. The hardware-accelerated function may be performed using the hardware assistance resources 140 more efficiently as compared to performing the function in software running on a general-purpose processor. As non-limiting examples, the hardware-accelerated function that utilizes the hardware assistance resources 140 may be related to cryptographic operations, graphics processing, etc.

In another example, the agent 114 on the host 112 may initiate an extended function that is enabled by the hardware assistance resources 140 accessible via the hardware assisted overlay network 110. The extended function may refer to a function initiated by the agent 114 that is enabled by the hardware assistance resources 140. For example, using the hardware assistance resources 140, the agent 114 on the host 112 may initiate an extended function of encrypting packets that are sent to various entities in the service provider environment 100. The agent 114 on the host 112 may perform a service discovery to determine the existence of these entities or hardware accelerated services, and then the agent 114 on the host 112 may use the hardware assistance resources 140 to encrypt the packets using specialized frame headers. In another example, the agent 114 on the host 112 may utilize the hardware assistance resources 140 to initiate an extended function of sending special types of frames or packets (e.g., packets with a certain type of security tag or acceleration tag) to various entities in the service provider environment 100 that initiate the use of the hardware accelerated functions.

In yet another example, the agent 114 on the host 112 may perform the service discovery to identify a route server in the service provider environment 100. The agent 114 on the host 112 may create an overlay connection to the route server. The route server may authenticate the agent 114 on the host 112, and upon determining that the host 112 is operating in the hardware assisted overlay network 110, the route server may be used to receive packets from the host 112 and direct routes for the packets to defined network destinations, and the agent 114 on the host 112 may handle the routes to the defined network destinations using the hardware assistance resources 140 that are accessible via the hardware assisted overlay network 110.

In one example, the agent 114 on the host 112 may utilize the hardware assistance resources 140 to initiate communication with various services 150 in the service provider environment 100. In other words, the hardware assistance resources 140 may enable the extended function of communicating with the various services 150 in the service provider environment 100. For example, the agent 114 on the host 112 may communicate with a security service to turn on or off encryption for packets being sent through the security service. The services 150 that are accessed by the agent 114 on the host 112 using the hardware assistance resources 140 may include services that are related to computing, storage, networking, database, analytics, application services, deployment, management, mobile, developer tools, and tools for the Internet of Things (IoT), etc. The agent 114 on the host 112 may send packets to the services 150 and/or make application program interface (API) calls to the services 150 using the hardware assistance resources 140 and/or via the hardware assisted overlay network 110.

In one example, the hardware assisted overlay network 110 may provide a number of features and benefits to the host 112 that is operating in the hardware assisted overlay network 110. For example, the hardware assisted overlay network 110 may provide a service insertion feature for the host 112. In virtualized networking, service insertion may allow services to be inserted, reconfigured and removed in a seamless manner. Examples of such services that may be inserted include firewalls, load balancers, traffic inspection, secure sockets layer (SSL) offloading, application acceleration, etc. The hardware assisted overlay network 100 may enable packets to be sent to these additional services. In another example, the hardware assisted overlay network 110 may provide the host 112 with an ability to send encrypted packets. In addition, the hardware assisted overlay network 110 may enable the host 112 to send and receive packets at an increased packet rate.

In one example, the hardware assisted overlay network 110 may be associated with a certain type of overlay network. For example, the hardware assisted overlay network 110 may be a high performance computing (HPC) overlay network or an enterprise feature overlay network. Each type of overlay network may have specific types of hardware assistance resources 140. The hardware assistance resources 140 may be accessible to a certain type of overlay network by sending packets to the hardware assistance resources 140.

Figure 1B:
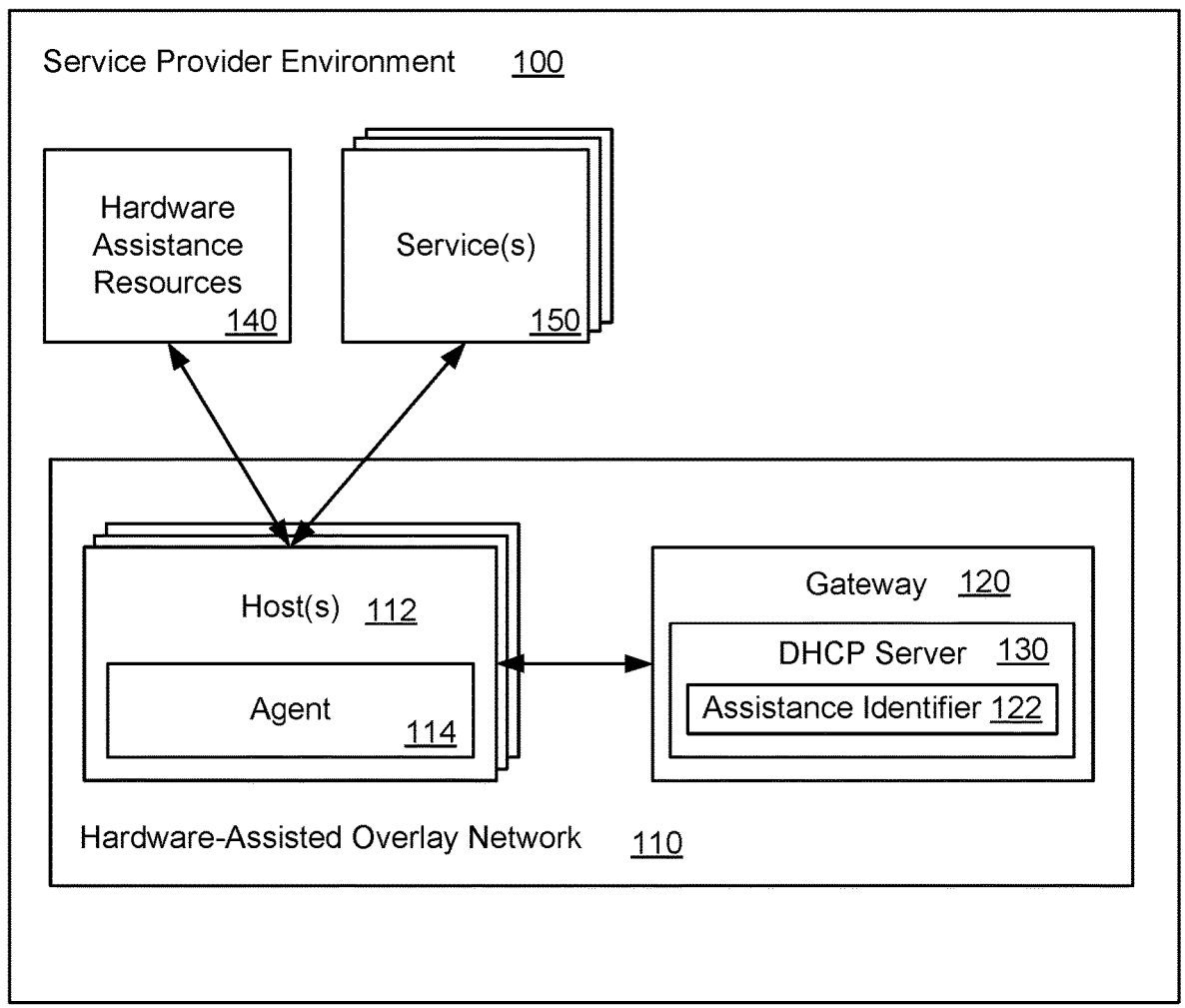
FIG. 1B illustrates another system and related operations for detecting hardware assistance for an overlay network according to an example of the present technology.

FIG. 1B illustrates an exemplary system and related operations for detecting a presence of hardware assistance for a hardware assisted overlay network 110 in a service provider environment 100. In this configuration, an assistance identifier 122 for a gateway 120 may be assigned by the gateway 120 using a dynamic host configuration protocol (DHCP) server 130 on the gateway 120. In other words, the gateway 120 and the DHCP server 130 may be combined to form a single entity. The gateway 120 may then determine whether the gateway 120 is included in the hardware assisted overlay network 110. When the gateway 120 is not included in the hardware assisted overlay network 110, the gateway 120 may assign the assistance identifier 122 to itself using an existing process (e.g., a random assignment of the assistance identifier 122). Alternatively, when the gateway 120 is included in the hardware assisted overlay network 110, the gateway 120 may assign the assistance identifier 122 to itself using a hash function, such that the assistance identifier 122 adheres to the predefined format.

In an alternative configuration, the agent on the host may access a domain name system (DNS) system to determine the assistance identifier for the gateway. The assistance identifier that is returned to the agent via the DNS system may indicate a type of network in which the gateway is included or available resources in the network. In other words, the assistance identifier that is returned to the agent via the DNS system may be based on a type of environment. For example, the assistance identifier may be returned with a special indication when the host is included in the hardware assisted overlay network. In another alternative configuration, the agent on the host may access public resources, such as public servers, to determine a location of the host, and thereby whether the host is included in the hardware assisted overlay network. In yet additional alternative configurations, the host may be restricted to using certain obscure addresses (e.g., 169.254.x.x), in which responses are expected when the hardware assisted overlay network is existent, or the host may be modified to utilize a special frame format that is only permitted to be forwarded when the hardware assisted overlay network is existent. However, these alternative configurations may negatively impact applications running on the host and/or the underlay network.

Figure 2:
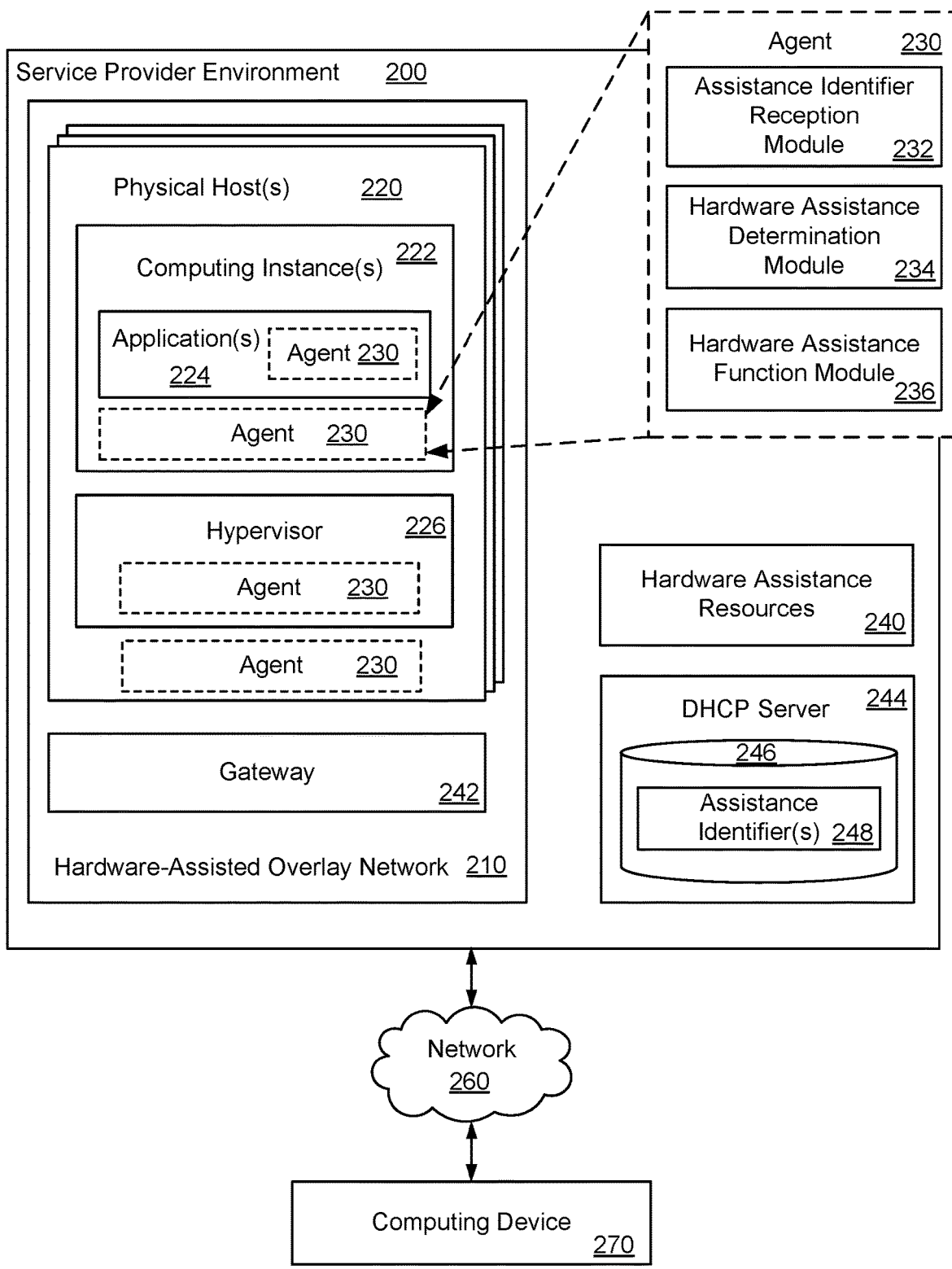
FIG. 2 is an illustration of a networked system for detecting hardware assistance for an overlay network according to an example of the present technology.

FIG. 2 illustrates components of an example service provider environment 200 according to one example of the present technology. The service provider environment 200 may include a physical host 220 that runs in a hardware assisted overlay network 210 within the service provider environment 200. The physical host 220 may run one or more computing instances 222, which may be launched based on requests received from a computing device 270. One or more applications 224 may be executed on the computing instances 222. The physical host 220 may include a hypervisor 226. The hardware assisted overlay network 210 may include a gateway 242, which may enable the application 224 running on the computing instance 222 to communicate with other networks, services, etc. An assistance identifier 248 for the gateway 242 may be assigned by a dynamic host configuration protocol (DHCP) server 244 that operates in the service provider environment 200. The DHCP server 244 may include a data store 246 that stores the assistance identifier 248 assigned to the gateway 242. The assistance identifier 248 may have been previously generated and stored in the data store 246. Alternatively, the assistance identifier 248 may be generated up on request. The hardware assisted overlay network 210 may access hardware assistance resources 240 (e.g., additional processing and storage hardware resources) in the service provider environment 200. In other words, the hardware assistance resources 240 may provide hardware assistance for the hardware assisted overlay network 210. In one example, the hardware assistance resources 240 may be located outside of the hardware assisted overlay network 210 and may be accessible to the hardware assisted overlay network 210, or alternatively, the hardware assistance resources 240 may be located in the physical host(s) 220 themselves and/or within the hardware assisted overlay network 210.

In one example, an agent 230 may be included in the physical host 220, the computing instance 222, the application 224 (e.g., a software container or a networked application) or the hypervisor 226. The agent 230 may utilize a number of modules for detecting a presence of the hardware assisted overlay network 210. For example, the agent 230 may include an assistance identifier reception module 232, a hardware assistance determination module 234, a hardware assistance function module 236, and other applications, services, processes, systems, engines, or functionality not discussed in detail herein.

The assistance identifier reception module 232 may receive the assistance identifier 248 that is assigned to the gateway 242. The assistance identifier reception module 232 may receive the assistance identifier 248 from the DHCP server 244 or from the gateway 242. The assistance identifier reception module 232 may receive the assistance identifier 248 in response to initiating an address resolution protocol (ARP). In other words, the assistance identifier reception module 232 may initiate the ARP to retrieve the assistance identifier 248 for the gateway 242.

The hardware assistance determination module 234 may compare the assistance identifier 248 to a set of rules or a predefined format. Based on the comparison, the hardware assistance determination module 234 may determine that the assistance identifier 248 matches or corresponds to the predefined format; or alternatively, the hardware assistance determination module 234 may determine that the assistance identifier 248 does not match or does not correspond to the predefined format. The hardware assistance determination module 234 may detect a presence of the hardware assisted overlay network 210 when the assistance identifier 248 matches or corresponds to the predefined format. Alternatively, the hardware assistance determination module 234 may detect an absence of the hardware assisted overlay network 210 when the assistance identifier 248 does not match or does not correspond to the predefined format.

The hardware assistance function module 236 may initiate a hardware assisted function that utilizes the hardware assistance resources 240 that are accessible via the hardware assisted overlay network 210. For example, the hardware assistance function module 236 may initiate a hardware-accelerated function that is enabled by the hardware assistance resources 240. In another example, the hardware assistance function module 236 may initiate an extended function that is enabled by the hardware assistance resources 240. The hardware assistance function module 236 in the agent 230 may send out packets, API calls, hypervisor calls, etc. to access the hardware assistance resources 240, and these hardware assistance resources 240 may enable the hardware assistance function module 236 to initiate the hardware-accelerated function and/or the extended function for the data or packets received. For example, the hardware assistance resources 240 may be located outside the hardware assisted overlay network 210 or within the hardware assisted overlay network 210, such as within the physical host 220. Thus, a call may be made to use the hardware acceleration on the physical host 220. In another example the packets or API calls may be sent to peer computing instances (e.g., similar computing instances or hardware accelerated computing instances) or applications located in the service provider environment. For example, the peer computing instance may be configured to provide all the packet routing functions for one or more computing instances and they may allow for a large number of packet routes to be centrally managed (e.g., tens of thousands of routes). In a similar example, the peer computing instance may perform hardware encryption for the sending computing instance to offload the encryption processes.

In one example, the data store 246 may include assistance identifier(s) 248. An assistance identifier 248 may be unique identifier that is assigned by the DHCP server 244 to the gateway 242 in the service provider environment 200. In one example, the assistance identifier 248 may be a media access control (MAC) address that is assigned by the DHCP server 244 to the gateway 242 in the service provider environment 200. The assistance identifier 248 for the gateway 242 may be generated and subsequently stored in the data store 246 of the DHCP server 244. In an alternative example, the assistance identifier 248 that is assigned to the gateway 242 may be a globally unique identifier, a universally unique identifier, etc. In addition, the assistance identifier 248 may be generated or created in accordance with a predefined format, which may indicate a presence of the hardware assisted overlay network 210. For example, the assistance identifier 248 may be hashed using certain types of information (e.g., virtual network identifier, PSK, user name, domain name, etc.) to be in accordance with the predefined format, thereby indicating the presence of the hardware assisted overlay network 210.

The computing device 270 may comprise, for example a processor-based system. The computing device 270 may be a device such as, but not limited to, a desktop computer, laptop or notebook computer, tablet computer, mainframe computer system, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. One example of such services may be the hardware assistance resources 240. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
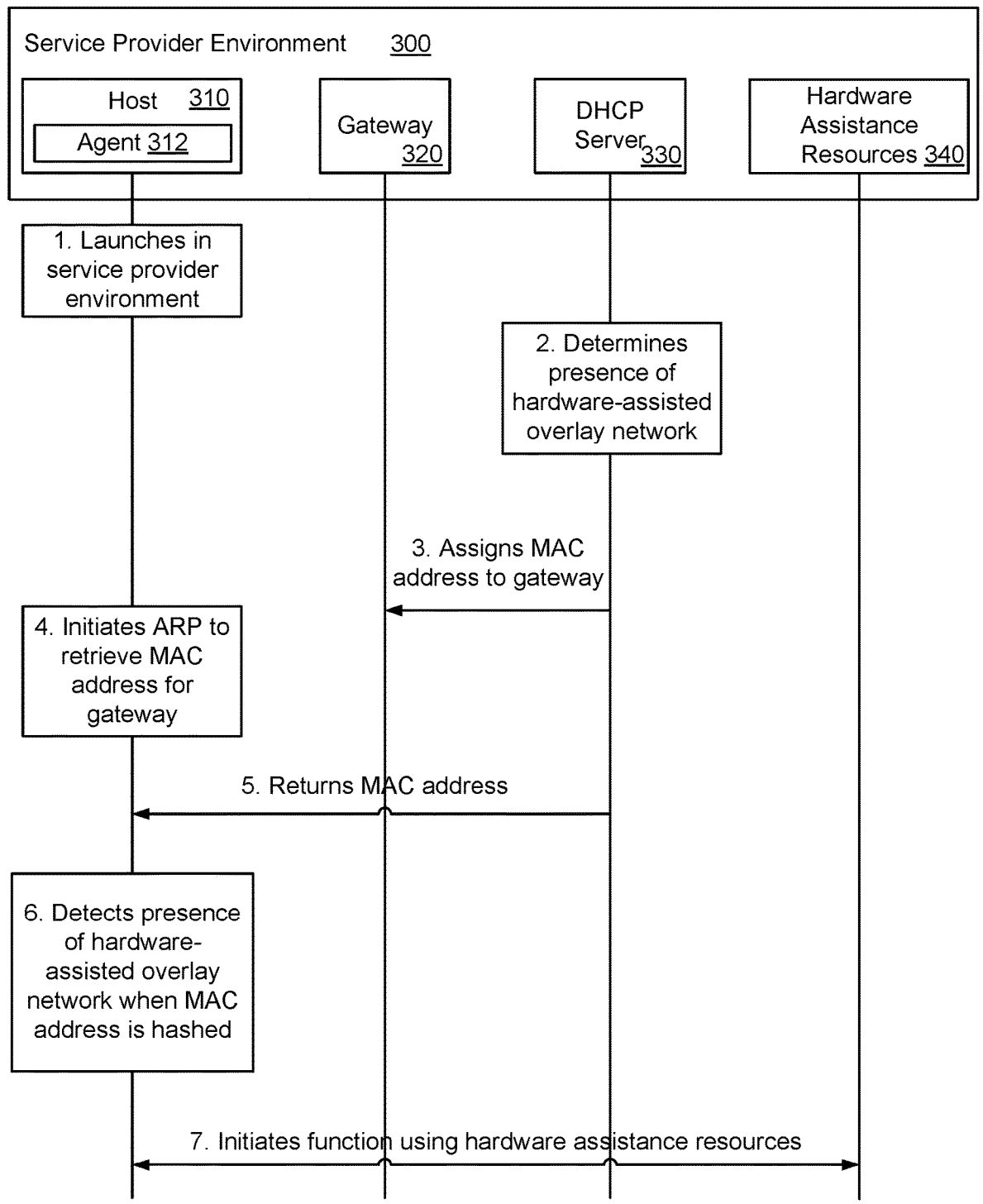
FIG. 3 illustrates operations for detecting hardware assistance for an overlay network according to an example of the present technology.

FIG. 3 illustrates exemplary operations for detecting a presence of hardware assistance for an overlay network. In a first step, a host 310 may be launched in a service provider environment 300. In one example, the host 310 may be a computing instance. The host 310 may be launched in a virtual network within the service provider environment 300. The virtual network may include a gateway 320, which may enable the host 310 to communicate with external devices and services within the service provider environment 300 or services outside the service provider environment 300. In a second step, a dynamic host configuration protocol (DHCP) server 330 in the service provider environment 300 may determine a presence of a hardware assisted overlay network. In other words, the DHCP server 330 may determine that the host 310 is launched in the virtual network that is included in the hardware assisted overlay network within the service provider environment 300. In one example, the DHCP server 330 may possess information in advance that indicates the presence of the hardware assisted overlay network in the service provider environment 300. Therefore, when the host 310 is launched in the virtual network, the DHCP server 330 may know about the hardware assisted overlay network in the service provider environment 300.

In a third step, the DHCP server 330 may assign a hashed media access control (MAC) address to the gateway 320 when the host 310 is launched in the hardware assisted overlay network. The DHCP server 330 may assign the hashed MAC address to the gateway 320 when the gateway 320 is powered on or started in the service provider environment 300. Alternatively, the DHCP server 330 may assign a non-hashed MAC address to the gateway when the host 310 is not launched in the hardware assisted overlay network (e.g., when the host 310 is not executing in an overlay network that is not hardware assisted). In a fourth step, the host 310 may initiate, via an agent 312 on the host 310, an address resolution protocol (ARP) to retrieve a MAC address for the gateway 320. At this point, the agent 312 on the host 310 does not have knowledge about whether the host 310 is part of the hardware assisted overlay network. In other words, at this point, the agent 312 on the host 310 is unaware of a presence (or absence) of the hardware assisted overlay network.

In a fifth step, the DHCP server 330 may provide the MAC address of the gateway 320 to the agent 312 on the host 310. The agent 312 on the host 310 may receive the MAC address, and then determine whether the MAC address is a hashed MAC address or a non-hashed MAC address. In a sixth step, the agent 312 on the host 310 may detect a presence of the hardware assisted overlay network when the MAC address assigned to the gateway 320 is a hashed MAC address. Alternatively, the agent 312 on the host 310 may detect an absence of the hardware assisted overlay network when the MAC address assigned to the gateway 320 is a non-hashed MAC address.

In one example, when the agent 312 on the host 310 detects the presence of the hardware assisted overlay network, the agent 312 on the host 310 may detect hardware assistance resources 340 in the service provider environment 300. For example, after detection of the hardware assisted overlay network, the agent 312 may request information about the hardware assistance resources 340 from a hardware assistance service. The hardware assistance service may respond to the request by providing information to the agent 312 that identifies the hardware assistance resources 340 in the service provider environment 300. For example, the hardware assistance service may provide information that enables the agent 312 to locate and access the hardware assistance resources 340 by using a specific address, function call, or API call. The hardware assistance resources 340 may provide additional processing and storage hardware resources. The hardware assistance resources 340 may be accessible or available to the agent 312 on the host 310 via the hardware assisted overlay network.

In a seventh step, the agent 312 on the host 310 may initiate a hardware assisted function (e.g., a hardware-accelerated function or an extended function) that is enabled by the hardware assistance resources 340 that are accessible via the hardware assisted overlay network. For example, the agent 312 on the host 310 may send packets, application program interface (API) calls, hypervisor calls, etc. to access the hardware assistance resources 340 (which may be located outside the hardware assisted overlay network or within the hardware assisted overlay network, such as within the host 310), and these hardware assistance resources 340 may enable the agent 312 on the host 310 to initiate the hardware-accelerated function and/or the extended function.

Figure 4:
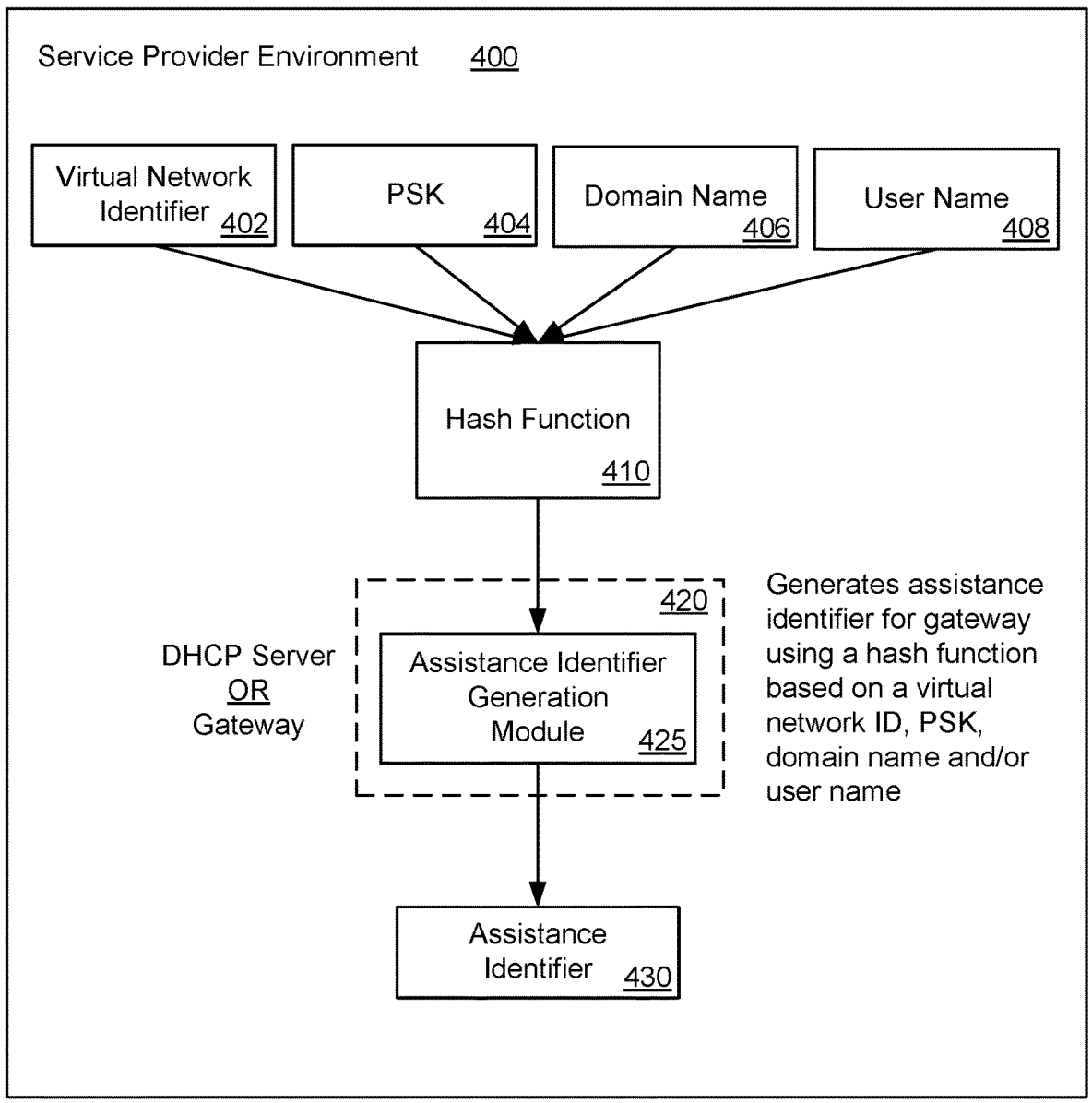
FIG. 4 illustrates a system and related operations for generating an assistance identifier for a gateway in a hardware assisted overlay network according to an example of the present technology.

FIG. 4 illustrates an exemplary system and related operations for generating an assistance identifier 430 (e.g., a media access control (MAC) address) for a gateway in a hardware assisted overlay network within a service provider environment 400. The assistance identifier 430 may be generated at an assistance identifier generation module 425, which may reside in a dynamic host configuration protocol (DHCP) server or in the gateway in the service provider environment 400. The assistance identifier generation module 425 may generate the assistance identifier 430 using a hash function 410. The hash function 410 may receive various inputs, such as a virtual network identifier 402, a preshared key (PSK) 404, a domain name 406 and/or a user name 408. The assistance identifier generation module 425 may use the hash function 410 to create a hashed value based on a combination of the virtual network identifier 402, the PSK 404, the domain name 406 and/or the user name 408, and the hashed value may assigned as the assistance identifier 430 for the gateway in the service provider environment 400.

Figure 5:
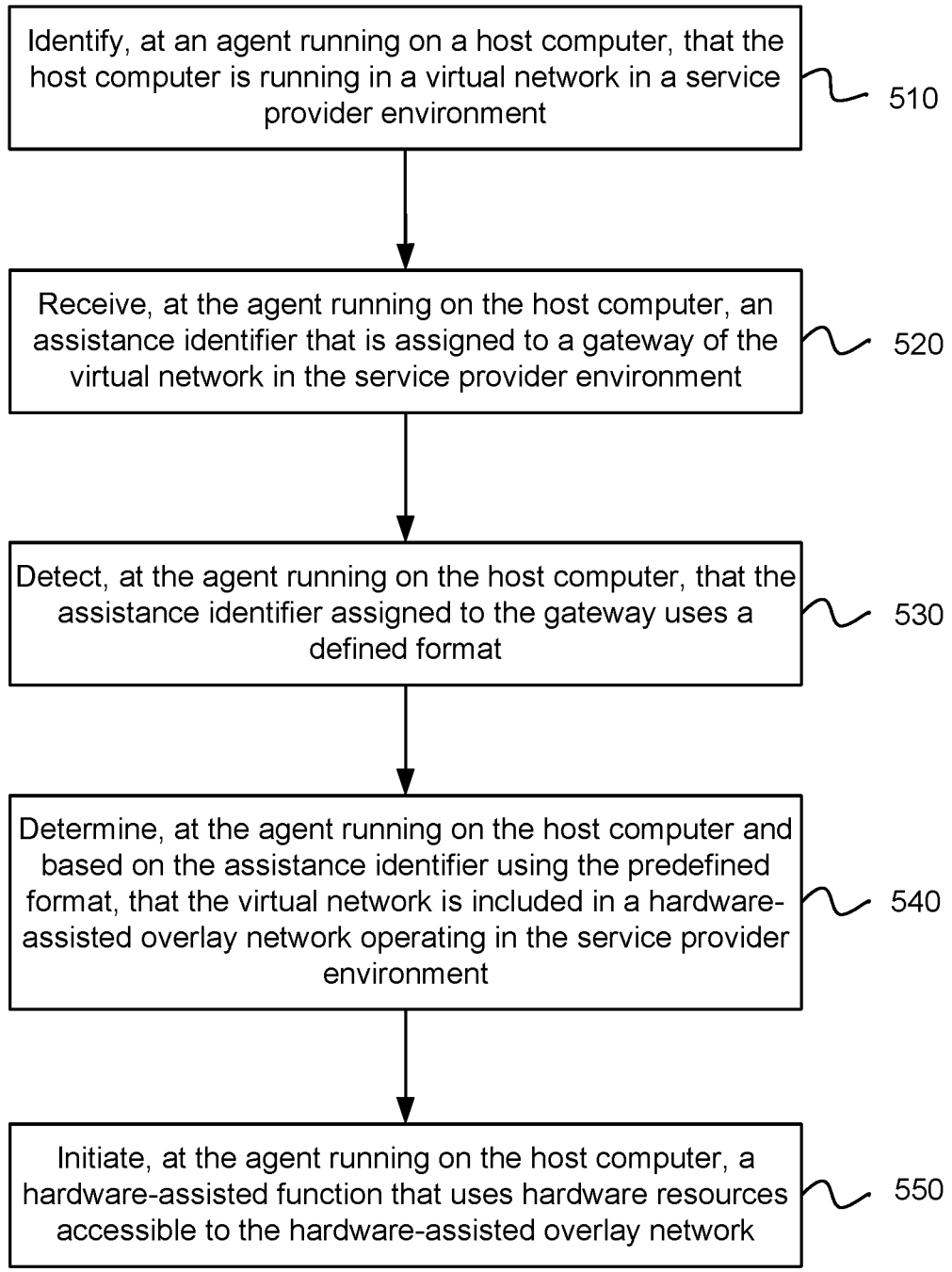
FIG. 5 is a flowchart of an example method for detecting hardware assistance for an overlay network.

FIG. 5 illustrates an example of a method for detecting hardware assistance for an overlay network. An agent running on a host computer may identify that the host computer is launched or booted up in a virtual network in a service provider environment, as in block 510. The host computer may run within the virtual network, such as a virtual private cloud (VPC). The virtual network may be logically isolated from other virtual networks in the service provider environment. In addition, the virtual network may be associated with a user account.

The agent running on the host computer may receive an assistance identifier (e.g., a media access control (MAC) address) that is assigned to a gateway associated with the virtual network in the service provider environment, as in block 520. For example, the agent may receive the assistance identifier that is assigned to the gateway from a dynamic host configuration protocol (DHCP) server that operates in the service provider environment. More specifically, the agent may receive the assistance identifier that is assigned to the gateway from the DHCP server during an address resolution protocol (ARP) for the default gateway.

The agent running on the host computer may detect that the assistance identifier assigned to the gateway corresponds to a predefined format, as in block 530. For example, the agent may detect that the assistance identifier corresponds to the predefined format when the assistance identifier is a hashed assistance identifier. The assistance identifier may be hashed based on a virtual network identifier for the virtual network that belongs to a customer, a preshared key (PSK), a user name, a time, and/or a domain name.

The agent running on the host computer may determine that the virtual network is a hardware assisted overlay network operating in the service provider environment based on the assistance identifier corresponding to the predefined format, as in block 540. In other words, the host computer may determine a presence of a hardware assisted overlay network when the assistance identifier corresponds to the predefined format, and alternatively, the host computer may determine an absence of a hardware assisted overlay network when the assistance identifier does not correspond to the defined predefined.

The agent running on the host computer may initiate a hardware assisted function that utilizes hardware resources accessible to the hardware assisted overlay network, as in block 550. For example, the agent may initiate a hardware-accelerated function that is enabled by the hardware resources accessible to the hardware assisted overlay network. As another example, the agent may initiate extended functions that are enabled by the hardware resources accessible to the hardware assisted overlay network. The extended functions may include a communication with a service operating in the service provider environment or a service over a network outside of the service provider environment.

Figure 6:
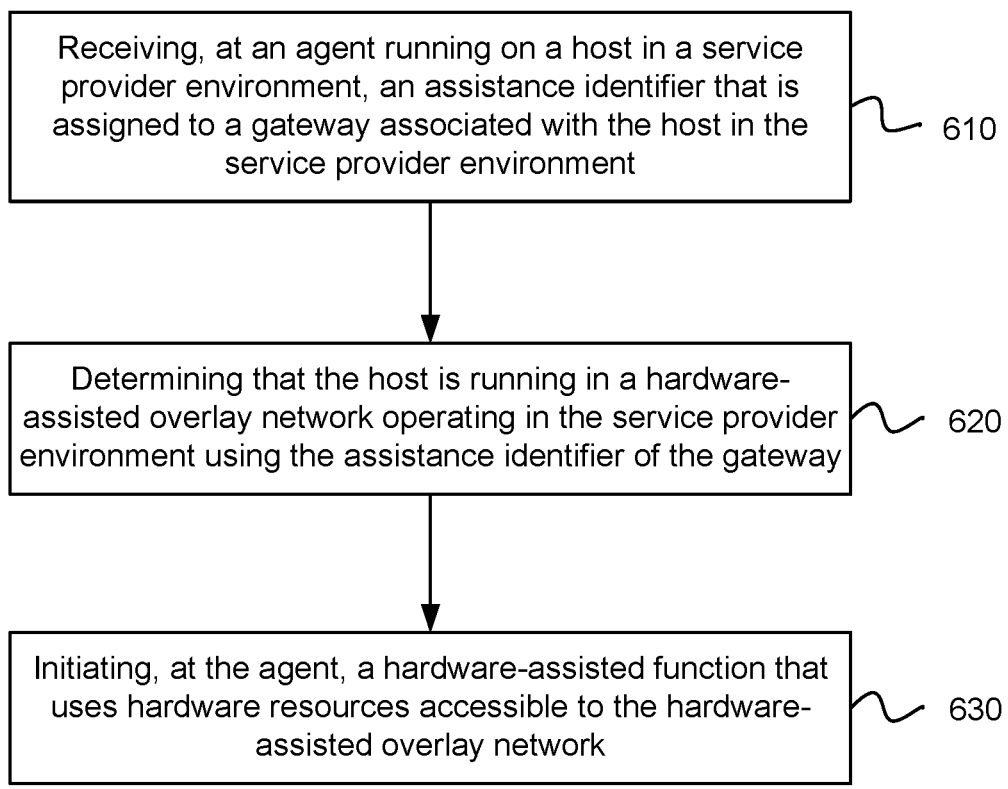
FIG. 6 is a flowchart of an example method for detecting hardware assistance for an overlay network.

FIG. 6 illustrates an example of a method for detecting hardware assistance for an overlay network. An agent running on a host in a service provider environment may receive an assistance identifier (e.g., a media access control (MAC) address) that is assigned to a gateway associated with the host in the service provider environment, as in block 610. The assistance identifier may be assigned to the gateway by a dynamic host configuration protocol (DHCP) server that operates in the service provider environment. The DHCP server may assign the assistance identifier to the gateway based on whether the gateway is included in a hardware assisted overlay network.

The agent running on the host may determine that the host is running in a hardware assisted overlay network operating in the service provider environment by using the assistance identifier of the gateway, as in block 620. For example, the agent may detect that the assistance identifier assigned to the gateway corresponds to a predefined format, such as an assistance identifier that is hashed based on a virtual network identifier, a preshared key (PSK), a user name and/or a domain name. When the assistance identifier corresponds to the predefined format, the agent may detect that the host is running on the hardware assisted overlay network.

The agent running on the host may initiate a hardware assisted function that utilizes hardware resources accessible to the hardware assisted overlay network, as in block 630. For example, the agent may initiate a hardware-accelerated function that is enabled by the hardware resources accessible to the hardware assisted overlay network. As another example, the agent may request extended functions that are enabled by the hardware resources accessible to the hardware assisted overlay network.

Figure 7:
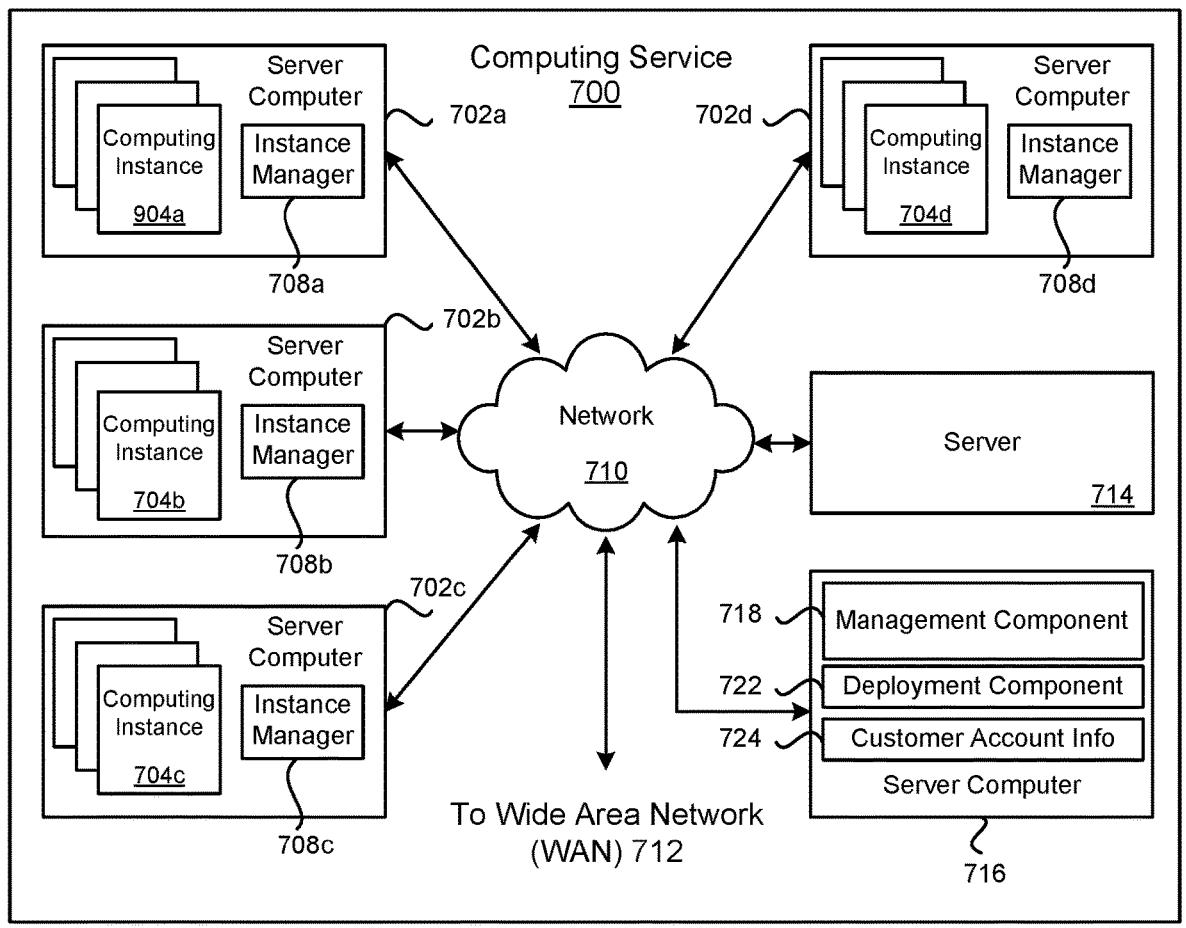
FIG. 7 is a block diagram of a service provider environment according to an example of the present technology.

FIG. 7 is a block diagram illustrating an example computing service 700 that may be used to execute and manage a number of computing instances 704a-d upon which the present technology may execute. In particular, the computing service 700 depicted illustrates one environment in which the technology described herein may be used. The computing service 700 may be one type of environment that includes various virtualized service resources that may be used, for instance, to host computing instances 704a-d.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702a-d. The server computers 702a-d may also be known as physical hosts. While four server computers are shown, any number may be used, and large data centers may include thousands of server computers. The computing service 700 may provide computing resources for executing computing instances 704a-d. Computing instances 704a-d may, for example, be virtual machines. A virtual machine may be an instance of a software implementation of a machine (i.e. a computer) that executes applications like a physical machine. In the example of a virtual machine, each of the server computers 702a-d may be configured to execute an instance manager 708a-d capable of executing the instances. The instance manager 708a-d may be a hypervisor, virtual machine manager (VMM), or another type of program configured to enable the execution of multiple computing instances 704*a-d* on a single server. Additionally, each of the computing instances 704*a-d* may be configured to execute one or more applications.

A server 714 may be reserved to execute software components for implementing the present technology or managing the operation of the computing service 700 and the computing instances 704*a-d*. A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache is to be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end customers may access the computing service 700. In addition, the network 710 may include a virtual network overlaid on the physical network to provide communications between the servers 702*a-d*. The network topology illustrated in FIG. 7 has been simplified, as many more networks and networking devices may be utilized to interconnect the various computing systems disclosed herein.

Figure 8:
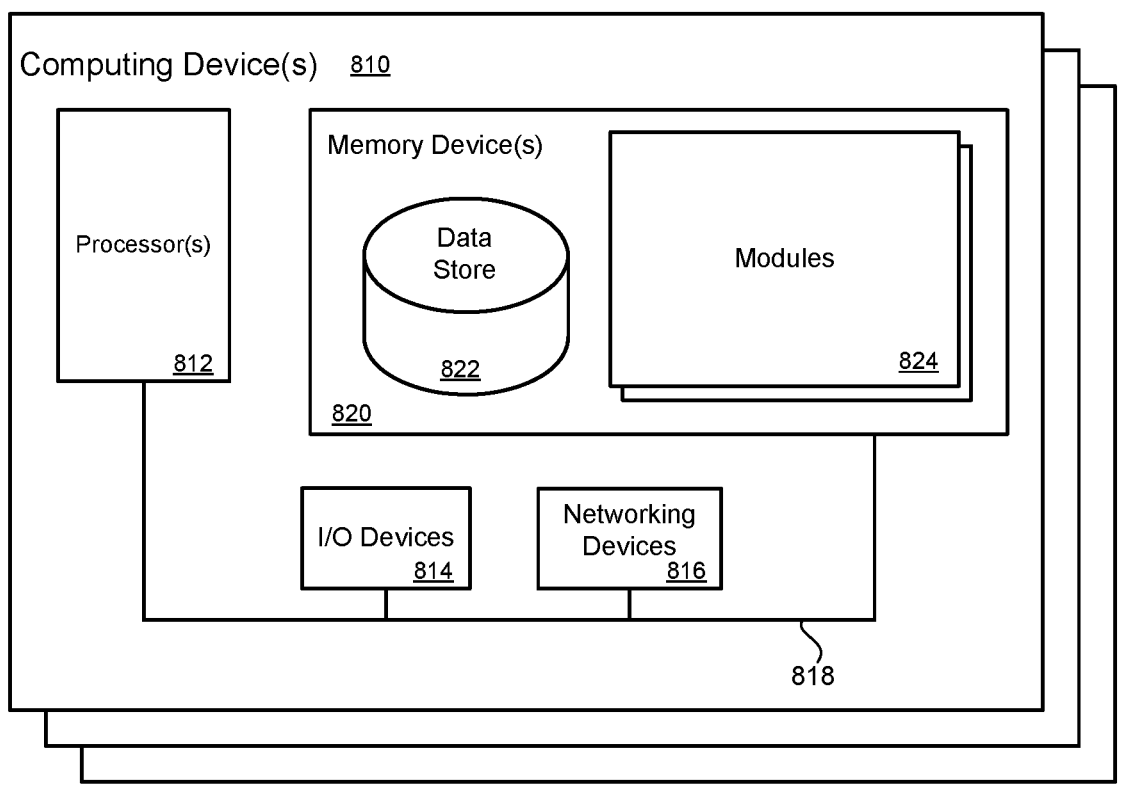
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
    at least one processor;
    at least one memory device including a data store to store a plurality of data and instructions that, when executed, cause the system to:
    identify, at an agent running on a host computer, that the host computer is running in a virtual network in a service provider environment;
    receive, at the agent running on the host computer, an assistance identifier that is assigned to a gateway of the virtual network in the service provider environment;
    detect, at the agent running on the host computer, that the assistance identifier assigned to the gateway uses a predefined format;
    determine, at the agent running on the host computer and based on the assistance identifier using the predefined format, that the virtual network is included in a hardware assisted overlay network operating in the service provider environment; and
    initiate, at the agent running on the host computer, a hardware assisted function that uses hardware resources accessible to the hardware assisted overlay network.

2. The system of claim 1, wherein the hardware assisted function includes a hardware-accelerated function or an extended function that is enabled by the hardware resources accessible to the hardware assisted overlay network, wherein the extended function includes a communication with a service operating in the service provider environment or a communication with a service over a network outside of the service provider environment.

3. The system of claim 1, wherein the predefined format of the assistance identifier is derived using a hash function, wherein the hash function uses a virtual network identifier for the virtual network that belongs to a customer, a pre-shared key (PSK), a user name, or a domain name.

4. The system of claim 1, wherein the hardware resources includes field-programmable gate arrays (FPGAs), programmable application-specific integrated circuits (ASICs), graphics processing units (GPUs), special-purpose or specialized hardware, vector processing hardware or optical computing hardware.

5. The system of claim 1, wherein the assistance identifier is assigned to the gateway by a dynamic host configuration protocol (DHCP) server that operates in the service provider environment.

6. A method, using one or more processors, comprising:
receiving, at an agent running on a host of a virtual network in a service provider environment, an assistance identifier that is assigned to a gateway associated with the host in the service provider environment;
detecting a predefined format associated with the assistance identifier:
determining, using-based in part on the predefined format associated with the assistance identifier, that the virtual network is included in a hardware assisted overlay network operating in the service provider environment; and
initiating, at the agent, a hardware assisted function that uses hardware resources accessible to the hardware assisted overlay network.

7. The method of claim 6, wherein the hardware assisted function includes a hardware-accelerated function or an extended function that is enabled by the hardware resources accessible to the hardware assisted overlay network, wherein the extended function includes a communication with a service operating in the service provider environment or a communication with a service over a network outside of the service provider environment.

8. The method of claim 6, wherein the assistance identifier of the gateway is created using a hash function, wherein the hash function uses a virtual network identifier, a preshared key (PSK), a user name, or a domain name.

9. The method of claim 6, wherein the hardware resources that are accessible to the host are included in a geographically independent network that includes an underlay network.

10. The method of claim 6, wherein the assistance identifier that is assigned to the gateway is a media access control (MAC) address.

11. The method of claim 6, wherein the assistance identifier is assigned to the gateway by a dynamic host configuration protocol (DHCP) server that operates in the service provider environment.

12. The method of claim 6, wherein the assistance identifier assigned to the gateway is determined at the gateway.

13. The method of claim 6, wherein the assistance identifier assigned to the gateway is accessed using an address resolution protocol (ARP).

14. The method of claim 6, wherein the gateway is identifiable in the hardware assisted overlay network via a dynamic host configuration protocol (DHCP) server that operates in the service provider environment.

15. The method of claim 6, wherein the host is a computing instance, a physical host, or a hypervisor.

16. A non-transitory machine readable storage medium having instructions embodied thereon, the instructions being executable by one or more processors to perform acts, comprising:
receiving, at an agent running on a host, an assistance identifier that is assigned to a gateway of a virtual network in a service provider environment;
detecting, at the agent running on the host, that the assistance identifier assigned to the gateway corresponds to a predefined format;
determining, at the agent running on the host, that the virtual network is a hardware assisted overlay network operating in the service provider environment based on the assistance identifier corresponding to the predefined format; and
initiating, at the agent running on the host, a hardware assisted function that uses hardware resources accessible to the hardware assisted overlay network.

17. The non-transitory machine readable storage medium of claim 16, wherein the instructions when executed further perform the act of: initiating a hardware-accelerated function or an extended function that is enabled by the hardware resources accessible to the hardware assisted overlay network, wherein the extended function includes a communication with a service operating in the service provider environment or a communication with a service over a network outside of the service provider environment.

18. The non-transitory machine readable storage medium of claim 16, wherein the host is a computing instance, a physical host, or a hypervisor.

19. The non-transitory machine readable storage medium of claim 16, wherein the predefined format of the assistance identifier is derived using a hash function, wherein the hash function uses a virtual network identifier, a preshared key (PSK), a user name, or a domain name.

20. The non-transitory machine readable storage medium of claim 16, wherein the assistance identifier is assigned to the gateway by a dynamic host configuration protocol (DHCP) server that operates in the service provider environment.

* * * * *